Sept. 30, 1941.  W. D. DE GARMO  2,257,292
FLUSH TANK VALVE
Filed April 1, 1940
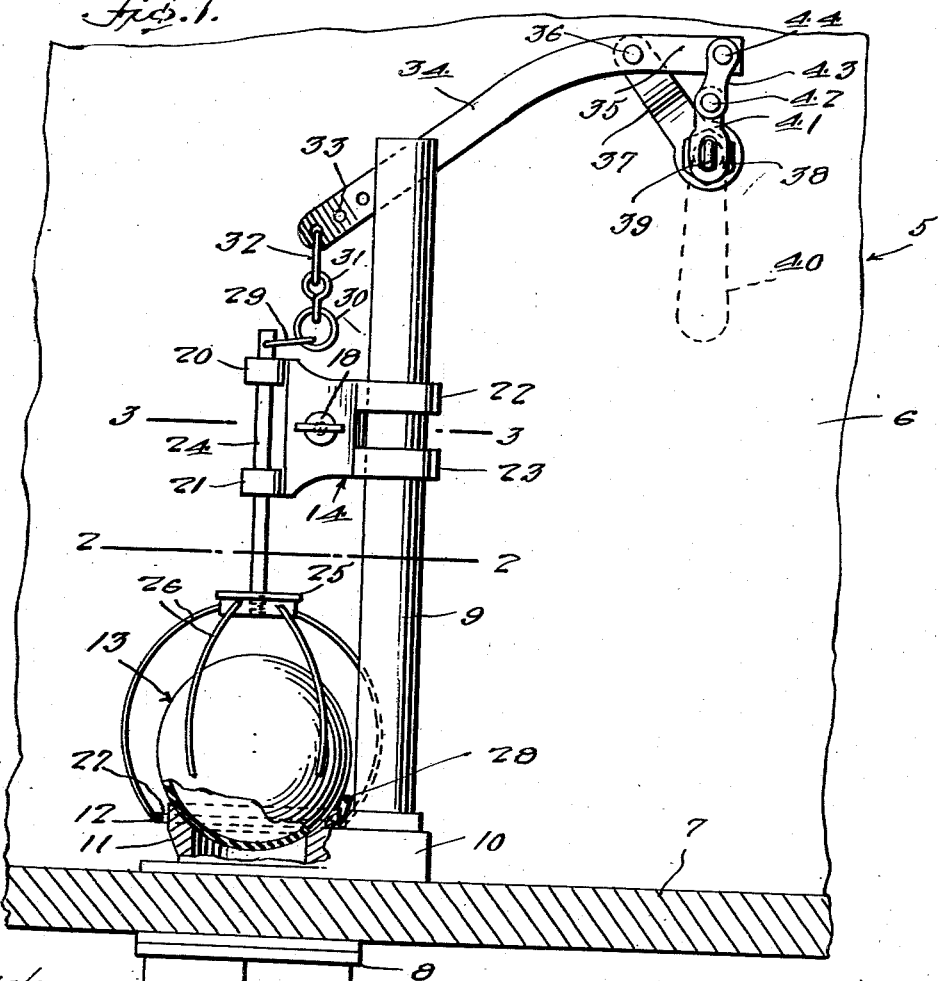
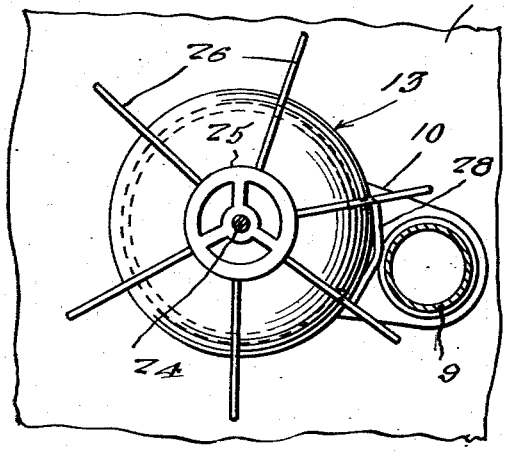
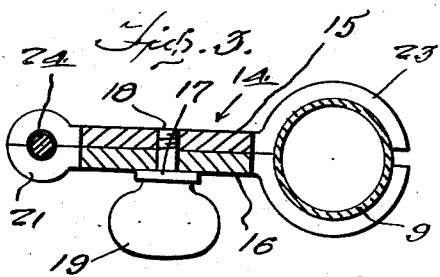
Inventor
Willis D. De Garmo
By Clarence A. O'Brien
Attorney Patented Sept. 30, 1941

2,257,292

UNITED STATES PATENT OFFICE 2,257,292

FLUSH TANK VALVE

Willis D. De Garmo, Fort Edward, N. Y.

Application April 1, 1940, Serial No. 327,333

1 Claim. (Cl. 4—57)

My invention relates to improvements in flush tank valves, particularly toilet flush tank valves, and an important object of the invention is to provide in such an arrangement superiorities consisting in greater freedom from wear, greater accessibility of parts, freer and more accurate action, and the elimination of a refill tube such as is necessary on conventional valves of this type.

Other important objects and advantages of my invention will be apparent from a reading of the following description taken in connection with the drawing, wherein for purposes of illustration I have shown a preferred embodiment of my invention.

In the drawing—

Figure 1 is a general sectional view taken through a flush tank to show the embodiment positioned therein, with the valve in a closed position.

Figure 2 is a fragmentary horizontal sectional view taken through Figure 1 approximately on the line 2—2 and looking downwardly in the direction of the arrow.

Figure 3 is an enlarged horizontal sectional view taken through Figure 1 approximately on the line 3—3 and looking downwardly in the direction of the arrow.

Referring in detail to the drawing, the numeral 5 generally designates the flush tank, such as an ordinary toilet tank, which includes the vertical side or end wall 6 and the bottom 7, the latter having the valve seat fitting 8 therein. In accordance with the present invention a perpendicular tube 9 is mounted on the bottom 7 by means of a suitable base 10 which may advantageously contain and have as a part thereof a wide unrestricted valve seat 11 which is formed with a concaved annular seating surface 12 in which is adapted to seat by gravity a relatively large globular body 13 which can suitably be a ball of relatively heavy flexible rubber or other similarly adequate material for making a close seat when in its gravitationally depressed position, such as a hollow rubber ball, a solid rubber ball, having sufficient buoyancy to assist the lifting thereof by the mechanism described below. It will be observed that due to the freedom of the ball valve 13 to revolve freely in the cage while off the seat 12 and the consequent ability of the ball to change the part thereof presented to the valve seat, such wear as may take place is distributed over the surface of the ball, making for long life and efficiency.

In a selected position along the tube 9 is a guide support which is generally designated 14 and which consists in similar plates 15 and 16, respectively, through one of which passes the shank 17 on the clamping bolt 18 which threads into the other plate, the bolt having a suitable wing nut thereon. At one end of the plates 15 and 16 are relatively small-semicircular opposed pairs of ears 21, while on the opposite ends of these plates 15 and 16 are upper and lower pairs of relatively large diameter semi-circular ears 22 and 23 which grip the exterior of the tube 9. The inner surfaces of the pairs of ears 20 and 21 slidably accommodate the guide rod 24 which projects from the upper end of the valve elevating cage which consists of a spoke-equipped wheel 25 into the hub of which the lower end of the rod 24 is threaded, the wheel having projecting from its periphery in a downwardly and laterally outwardly and then laterally inwardly direction, a suitable number of arms 26 which may suitably be of stout wire terminating at their lower ends in junctions with the ring 27 which is disrupted adjacent the tube 29 and deformed to provide the laterally outset portion 28 which is also upwardly offset as indicated in Figure 1 to rest on the base 10 and be thereby supported in a position below and out of contact with the ball 13, so that the arms 26 and the ring 27 are disengaged from the ball 13 which is then free to settle in the valve seat. The engagement of the part 28 with the base 10 prevents the cage from reaching a needlessly depressed position.

On the upper end of the guide rod 24 is a freely swingable ring 29 through which is engaged another ring 30 which, in turn, is connected by linkage 31 having a hook 32 to engage selectively in any one of the several holes 33 in the valve arm 34 adjacent the free end of the valve arm.

The main portion of the valve arm 34 extends normally in a declining position as illustrated in Figure 1 of the drawing while a minor portion thereof extends in a substantially horizontal position as indicated by the numeral 35, a point of the arm between these portions being traversed by a pivot 36 whereby the arm is mounted on the upper end of a bracket 37 which extends laterally and inwardly from the side or end wall 6 of the tank 5 to make the lever 34 clear the side or end of the tank.

A conventional through-the-wall mounting 38 rigidly connects the bracket 37 to the wall 6, while a shaft 39 turned by the handle 40 on the outside of the tank extends through the mounting 38 and has on its laterally inward end a crank arm 41 which is pivoted as indicated by the numeral 42 to the link 43 which has its upper end pivoted as indicated by the numeral 44 to the terminal of the normally horizontal portion 35 of the lever 34, all as clearly illustrated in Figure 1 of the drawing. It is obvious that upon swinging the handle 40 in a left hand direction, the left hand terminal end of the lever 34 will be swung upwardly and through its connections with the rod 24 of the ball valve elevating cage, will elevate the said cage and cause the ball 13 to be drawn upwardly and be unseated from the valve seat 11, so as to permit the water to flow through the fitting 8 to empty the tank. When the grasp of the operator on the handle 40 is released, the weight of the ball 13, that of the cage and its rods, and the overbalanced portion of the lever 34 will cause the mentioned components to fall gravitationally and permit the ball valve 13 to resume its place on the valve seat, thereby cutting off further flow of water from the tank.

The herein disclosed arrangement makes the usual refill tube employed in toilet bowl flush tanks for filling the bowl after flushing unnecessary, for the reason that when the ball 13 is lifted off the seat 11 immediate and substantially unrestricted and complete exit of all of the water in the tank 5 takes place, this action causing the toilet bowl to be emptied or syphoned out so thoroughly that the necessary partial refilling of the toilet bowl after flushing is accomplished by the latter stages of the flushing action. This saves the relatively large amount of water which is ordinarily wasted by the action of the refill tube in putting water in the toilet bowl during the time the flush tank is refilling, to bring up the water in the bowl to its outlet level.

Although I have shown and described herein a preferred embodiment of my invention, it is to be definitely understood that I do not desire to limit the application of my invention thereto except as required by the scope of the subjoined claim.

Having described the invention, what is claimed as new is:

In a valve for flush tanks, a base having a water outlet passage and a valve seat therefor, a ball valve coacting with the seat for controlling flow of water through the passage, a standpipe rising vertically from the base adjacent said seat and the ball valve, a guide mounted on said standpipe, a rod slidably and rotatably supported by said guide, a hub detachably secured to one end of the rod, arcuately curved spaced members formed on said hub and loosely receiving the ball valve, an annular member connecting said arcuately curved members and of a diameter smaller than the diameter of said ball valve and provided with an offset portion extending upwardly from the plane of said annular member to contact the base and the stand pipe and with a pair of the arcuately curved members straddling said stand pipe to prevent said annular member from contacting the seat and having undue rotation relative thereto, and an operating means connected to the other end of the rod.

WILLIS D. DE GARMO.